United States Patent [19]

Lagally et al.

[11] 3,742,060

[45] June 26, 1973

[54] PREPARATION OF AMINES
[75] Inventors: Ralph W. Lagally; Johann G. D. Schulz, both of Pittsburgh, Pa.
[73] Assignee: Gulf Research & Development Company, Pittsburgh, Pa.
[22] Filed: Nov. 24, 1969
[21] Appl. No.: 879,601

[52] U.S. Cl. ............................................. 260/585 A
[51] Int. Cl. ............................................. C07c 85/04
[58] Field of Search ................................ 260/585 A

[56] References Cited
UNITED STATES PATENTS

| | | | |
|---|---|---|---|
| 3,379,764 | 4/1968 | Wyness et al. | 260/585 |
| 3,542,876 | 11/1970 | Blaney et al. | 260/585 |
| 3,487,111 | 12/1969 | Kurtz et al. | 260/585 |
| 3,484,488 | 12/1969 | Lichtenwalter et al. | 260/585 |
| 3,471,561 | 10/1969 | Dadekian et al. | 260/585 |
| 3,497,555 | 2/1970 | Dudzinski | 260/585 |
| 3,299,142 | 1/1967 | Simpson | 260/585 |
| 3,399,236 | 8/1968 | Mills | 260/585 |
| 3,450,766 | 6/1969 | Steinmetz | 260/585 |

FOREIGN PATENTS OR APPLICATIONS 1,147,984  4/1969  Great Britain ..................... 260/585

Primary Examiner—Lewis Gotts
Assistant Examiner—C. F. Warren
Attorney—Meyer Neishloss, Deane E. Keith and Joseph J. Carducci

[57] ABSTRACT

A process for preparing alkyl amines which involves reacting an alkyl halide with ammonia in water as a reaction medium.

3 Claims, No Drawings

PREPARATION OF AMINES

This invention relates to a process for the preparation of alkyl amines by the ammonolysis of alkyl halides.

In U.S. Pat. No. 3,299,142 of Simpson it is noted that when alkyl amines are prepared by the ammonolysis of alkyl halides in an alcoholic reaction medium, such as methanol or ethanol, the procedure results in the initial production of a hydrohalide salt which must then be treated with a base, such as sodium hydroxide, in order to obtain the free amine. Simpson found that the process could be carried out without the formation of the hydrohalide salt and without recourse to the use of a base by the mere expedient of conducting the reaction in a liquid glycol reaction medium instead of an alcohol such as methanol or ethanol. We have found that even Simpson's process can be improved, and greater yields of desired alkyl amines can be obtained at lower temperatures by carrying out the reaction in a water medium.

Alkyl halides which can be used herein can be defined, for example, by the following general formula $X-(CH_2)_n-Y$, wherein X can be iodine, chlorine or bromine, Y can be iodine, chlorine, bromine or hydrogen and $n$ can be an integer from one to 30, preferably from one to 20. In the above formula it is intended that X and Y be located at any position on the chain. Examples of alkyl halides which are therefore suitable herein are chloromethane, 2-iodopropane, 1-chloropentane, 3-chlorooctane, 1,6-dibromohexane, 1,4,7,10-tetrachlorodecane, 1,2,3,4,5,6-hexachlorocyclohexane, 2-iodoeicosane, 2,20-dichlorotricontane, etc. Ammonia employed as a reactant herein can be liquid or gaseous, preferably liquid.

The amounts of reactants and water employed can be varied over wide ranges. Generally, the mol ratio of ammonia to alkyl halide can be at least about 2:1, preferably about 5:1 to about 75:1. The amount of water relative to the alkyl halide, on a weight basis, can be, for example, from about 0.5:1 to about 5:1, preferably from about 0.5:1 to 2:1.

The reaction can be carried out simply by bringing the reactants together and maintaining the same at reaction temperature and pressure for a designated period of time. Thus, the temperature can be as low as about 0° and as high as about 200° C., but, in general, a temperature of about 30° to about 120° C. is preferred. Pressure can vary from about atmospheric to about 500 pounds per square inch gauge, although for ease of operation a pressure of about 30 to about 100 pounds per square inch gauge is preferred. A reaction time of about 0.5 to about 100, preferably about one to about 50, hours will suffice.

At the end of the reaction period the alkyl amine is recovered from the reaction mixture in any suitable manner. For example, the reaction mixture can be cooled to room temperature and unreacted ammonia vented therefrom. The remainder of the reaction mixture can then be extracted with a non-polar solvent, such as chloroform, carbon tetrachloride, hexane, etc. The amine product can then be separated from the non-polar solvent by subjecting the extract to evaporation or fractional distillation. Ammonium salts which are formed as by-product, and any amine salt which may have formed, will be in the remaining aqueous layer.

The process can further be illustrated by the following.

EXAMPLE I

A 1-liter autoclave was charged with 86.5 grams (0.45 mol) of normal octyl bromide, 130 milliliters of ethylene glycol and, after cooling to −40° C., 170 grams (10mols) of liquefied anhydrous ammonia. The autoclave was sealed, heated to 80° C. and maintained at this temperature for 2 hours. The autoclave was then cooled, excess ammonis vented, and the crude product removed. The autoclave was washed several times with glycol, and the combined product and washings extracted five times with carbon tetrachloride. Evaporation of the combined extracts gave 69.1 grams of pale yellow residue. Gas chromatographic analysis of the mixture showed that n-octyl amine was produced in 68.0 per cent efficiency, dioctyl amine in 18.5 per cent efficiency, and trioctyl amine in 3.2 per cent efficiency, with 100 per cent conversion of the starting octyl bromide.

EXAMPLE II

A 1-liter autoclave was charged with 96.5 grams (0.50 mol) of normal octyl bromide, a mixture of 75 milliliters of n-propyl alcohol and 75 milliliters of hexane, and, after cooling to −40° C., 170 grams (10 mols) of liquefied anhydrous ammonia. The autoclave was sealed, heated to 80° C., and maintained at this temperature for 2 hours. The autoclave was then cooled, excess ammonia vented, and the crude product removed. The autoclave was washed several times with hexane, and the washings added to the product. The solid ammonium bromide was filtered off and washed with hexane, amounting to 42 grams, corresponding to a 85.7 per cent efficiency. The combined filtrate and washings were evaporated, yielding 72.7 grams of pale yellow residue. Gas chromatographic analysis of the mixture showed that n-octyl amine was produced in 64.3 per cent efficiency, dioctyl amine in 18.8 per cent efficiency, and trioctylamine in 3.2 per cent efficiency, with 100 per cent conversion of the starting octyl bromide.

EXAMPLE III

A 1-liter autoclave was charged with 96.5 grams (0.50 mol) of normal octyl bromide, 150 milliliters of hexane and, after cooling to −40° C., 170 grams (10 mols) of liquefied anhydrous ammonia. The autoclave was sealed, heated to 80° C., and maintained at this temperature for 2 hours. The autoclave was then cooled, excess ammonia vented, and the crude product removed. The autoclave was washed several times with hexane, and the washings added to the product. The precipitated ammonium bromide was filtered off and washed with hexane. The solid ammonium bromide amounted to 45 grams, corresponding to a 91.8 per cent efficiency. The combined filtrate and washings were evaporated, yielding 63.5 grams of pale yellow residue. Gas chromatographic analysis of the mixture showed that n-octyl amine was formed in 57.5 per cent efficiency, dioctylamine in 26.6 per cent efficiency, and trioctyl amine in 2.8 per cent efficiency, with 100 per cent conversion of starting octyl bromide.

EXAMPLE IV

A one-liter autoclave was charged with 96.5 grams (0.50 mol) of normal octyl bromide, 150 milliliters of n-propyl alcohol, and, after cooling to −40° C., 170 grams (10 mols) of liquefied anhydrous ammonia. The autoclave was sealed, heated to 80° C., and maintained at this temperature for 2 hours. The autoclave was then cooled, excess ammonia vented, and the crude product removed. The autoclave was washed several times with hexane, the washings added to the product, and the product diluted with more hexane. The precipitated ammonium bromide was filtered off and washed with hexane. The solid ammonium bromide amounted to 42 grams corresponding to a 85.7 per cent efficiency. Evaporation of the combined filtrate and washings gave 62.3 grams of pale yellow residue. Gas chromatographic analysis of the mixture showed that n-octyl amine was formed in 69.0 per cent efficiency, dioctyl amine in 16.2 per cent efficiency, and trioctylamine in 4.2 per cent efficiency, with 100 per cent conversion of starting octyl bromide.

EXAMPLE V

A 1-liter autoclave was charged with 96.5 grams (0.50 mol) of normal octyl bromide, 150 milliliters of methanol, and, after cooling to −40° C., 170 grams of liquefied anhydrous ammonia. The autoclave was sealed, heated to 80° C., and maintained at this temperature for 2 hours. The autoclave was then cooled, excess ammonia vented, and the crude product removed. The autoclave was washed several times with hexane, and the combined washings and product extracted six times with hexane. Evaporation of the combined hexane extracts gave 57.8 grams of pale yellow residue. Gas chromatographic analysis of the mixture showed that n-octyl amine was formed in 61.2 per cent efficiency, dioctyl amine in 21.7 per cent efficiency, and trioctyl amine in 2.1 per cent efficiency. Evaporation of the methanol layer gave 42.5 grams of ammonium bromide, corresponding to an efficiency of 86.7 per cent.

EXAMPLE VI

A one-liter autoclave, after cooling to −40° C., was charged with 170 grams (10 mols) of liquefied anhydrous ammonia. The autoclave was sealed and heated to 80° C., and 96.5 grams (0.50 mol) of normal octyl bromide pumped in over a 0.75-hour period. The autoclave was then cooled again to −40° C., and 150 milliliters of water added. After reheating to 80° C., the reaction mixture was maintained at this temperature for 1.5 hours. The autoclave was then cooled, excess ammonia vented, and the crude product removed. The autoclave was washed several times with water, and the combined product and washings extracted three times with chloroform. Evaporation of the combined extracts gave 74.8 grams of a pale yellow residue. Gas chromatographic analysis showed that n-octyl amine was produced in 82.3 per cent efficiency, dioctyl amine in 15.5 per cent efficiency, and trioctyl amine in 0.8 per cent efficiency, with 100 per cent conversion of starting octyl bromide.

EXAMPLE VII

A 1-liter autoclave, after cooling to −40° C., was charged with 170 grams (10 mols) of liquefied anhydrous ammonia. The autoclave was sealed and heated to 30° C., and 30.5 grams (0.125 mol) of 1,6-dibromohexane pumped in over a 6-hour period. The reaction mixture was allowed to stand overnight, then cooled to −40° C., and 50 milliliters of water added. The autoclave was then heated to 100° C. and maintained at this temperature for two hours. The autoclave was then cooled, excess ammonia vented, and the crude product removed. The autoclave was washed several times with chloroform, and the combined product and washings extracted three times with chloroform. Gas chromatographic analysis of the combined chloroform extracts showed that hexamethylenediamine was formed in 80.2 per cent efficiency, with 100 per cent conversion of starting 1,6-dibromohexane.

EXAMPLE VIII

A 1-liter autoclave, after cooling to −40° C., was charged with 215 grams (12.6 mols) of liquefied anhydrous ammonia. The autoclave was sealed and heated to 30° C., and 30.5 grams (0.125 mol) of 1,6-dibromohexane pumped in over a 4-hour period. The reaction mixture was allowed to stand overnight, then stirred for 0.5 hour and cooled to −50° C., and 80 milliliters of water slowly added. The autoclave was then heated to 100° C. and maintained at this temperature for 2 hours. The autoclave was then cooled, excess ammonia vented, and the crude product removed. The autoclave was washed several times with chloroform, and the combined product and washings extracted three times with chloroform. The aqueous layer was saturated with sodium chloride, and extracted twice with chloroform. The sodium chloride was used to decrease the solubility of the desired amine in the aqueous layer and therefore render it easier to extract with chloroform. Gas chromatographic analysis of the combined chloroform extracts showed that hexamethylenediamine was produced in 91.4 per cent efficiency, with 100 per cent conversion of starting 1,6-dibromohexane.

The advantages of operating in accordance with the process defined and claimed herein are apparent from the above. Although in each of Examples I, II, III, IV and V wherein the reaction was carried out in a reaction medium composed of ethylene glycol, n-propyl alcohol, hexane, or methanol, desired amines in good yield were obtained, in each of Examples VI, VII and VIII wherein water was employed as reaction medium increased yields of desired amines were obtained. In addition it is obvious that the use of water over the other reaction media enhances the commercial attractiveness of the process herein.

Obviously, many modifications and variations of the invention, as hereinabove set forth, can be made without departing from the spirit and scope thereof, and therefore only such limitations should be imposed as are indicated in the appended claims.

We claim:
1. A process for preparing a free, non-combined alkyl amine which consists in mixing an unsubstituted alkyl halide having from one to 30 carbon atoms, wherein the halogen portion can be selected from the group consisting of iodine, bromine and chlorine, with ammonia over a period of 0.75 to 6 hours at a temperature of 30° to 80° C., cooling said mixture and adding water thereto and thereafter heating the resulting mixture at a temperature of about 0° to about 200° C. and a pressure of about atmospheric to about 500 pounds per square inch gauge for about 0.5 to about 100 hours, the mol ratio of ammonia to said alkyl halide being from about 2:1 to about 75:1 and the amount of water relative to said alkyl halide, on a weight basis, being from about 0.5 to about 5:1.
2. The process of claim 1 wherein the alkyl halide is n-octyl bromide.
3. The process of claim 1 wherein the alkyl halide is 1,6-dibromohexane.

* * * * *